(12) United States Patent
Larner et al.

(10) Patent No.: US 7,304,681 B2
(45) Date of Patent: Dec. 4, 2007

(54) METHOD AND APPARATUS FOR CONTINUOUS FOCUS AND EXPOSURE IN A DIGITAL IMAGING DEVICE

(75) Inventors: Joel B. Larner, Fort Collins, CO (US); Gregory V. Hofer, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 774 days.

(21) Appl. No.: 10/762,872

(22) Filed: Jan. 21, 2004

(65) Prior Publication Data

US 2005/0157198 A1   Jul. 21, 2005

(51) Int. Cl.
*H04N 5/232*   (2006.01)
*H04N 5/238*   (2006.01)
*H04N 5/228*   (2006.01)
*H04N 5/235*   (2006.01)

(52) U.S. Cl. .................. 348/352; 348/222.1; 348/349; 348/364

(58) Field of Classification Search ........... 348/333.11, 348/345, 349, 352, 353
See application file for complete search history.

(56) References Cited

U.S. PATENT DOCUMENTS

| | | | | |
|---|---|---|---|---|
| 5,943,512 | A * | 8/1999 | Hamada et al. | 396/55 |
| 2003/0174772 | A1* | 9/2003 | Voronov et al. | 375/240.06 |
| 2004/0233282 | A1* | 11/2004 | Stavely et al. | 348/143 |
| 2005/0052553 | A1* | 3/2005 | Kido et al. | 348/296 |

* cited by examiner

*Primary Examiner*—Ngoc-Yen Vu
*Assistant Examiner*—Albert H Cutler (57) ABSTRACT

A digital imaging device performs automatic focus and exposure adjustments based on high-resolution frames when a scene change has been detected based on the analysis of low-resolution frames. The digital imaging device reduces battery power consumption while simultaneously shortening shutter lag.

27 Claims, 6 Drawing Sheets

METHOD AND APPARATUS FOR CONTINUOUS FOCUS AND EXPOSURE IN A DIGITAL IMAGING DEVICE

FIELD OF THE INVENTION

The present invention relates generally to digital photography and more specifically to continuous focus and exposure techniques for digital imaging devices.

BACKGROUND OF THE INVENTION

Digital imaging devices such as digital cameras typically include some kind of automatic focus and exposure feature. At one extreme, some digital cameras perform coarse exposure calculations to keep the image within reasonable exposure range, deferring fine focus and exposure calculations until the user presses the shutter button to the intermediate (S1) position. The result is considerable delay (often greater than one second) after the shutter button is depressed to the image capture (S2) position before the final image is captured. Although such an approach minimizes battery power consumption, it introduces shutter lag. At the opposite extreme, other digital cameras calculate focus and exposure continuously, even when the user is not intending to capture an image imminently. This approach consumes more battery power but shortens shutter lag. Still other digital cameras perform a coarse focus update using low-resolution frames when a lighting change is detected. Such an approach still requires a fine focus adjustment at S1, again resulting in shutter lag.

It is thus apparent that there is a need in the art for an improved method and apparatus for continuous focus and exposure in a digital imaging device.

SUMMARY OF THE INVENTION

A method for automatically maintaining focus and exposure settings in a digital imaging device is provided. A digital imaging device to carry out the method is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

An effective trade-off between battery power consumption and shutter lag may be achieved by monitoring low-resolution frames to detect a scene change and performing focus and exposure calculations based on high-resolution frames, when a scene change has been detected. These operations may be associated with a continuous focus and exposure mode of a digital imaging device. The continuous focus and exposure mode may be activated manually or automatically in a variety of ways. Also, a variety of different formats may be employed for the high-resolution frames that are used to adjust focus and exposure. Scene analysis to detect scene changes may be simple (e.g., detection of a change in aggregate luminance) or complex (e.g., detection of a single moving element in an otherwise static scene to avoid unnecessary adjustments). Further, such a continuous focus and exposure mode may be operated with the live view feature (low-resolution video of the current scene) of the digital imaging device enabled or disabled.

The remainder of this detailed description presents the techniques and principles of the invention in the context of a digital camera, but those techniques and principles are applicable to any digital imaging device, including a digital camcorder having a still-picture capture mode.

Figure 1A:
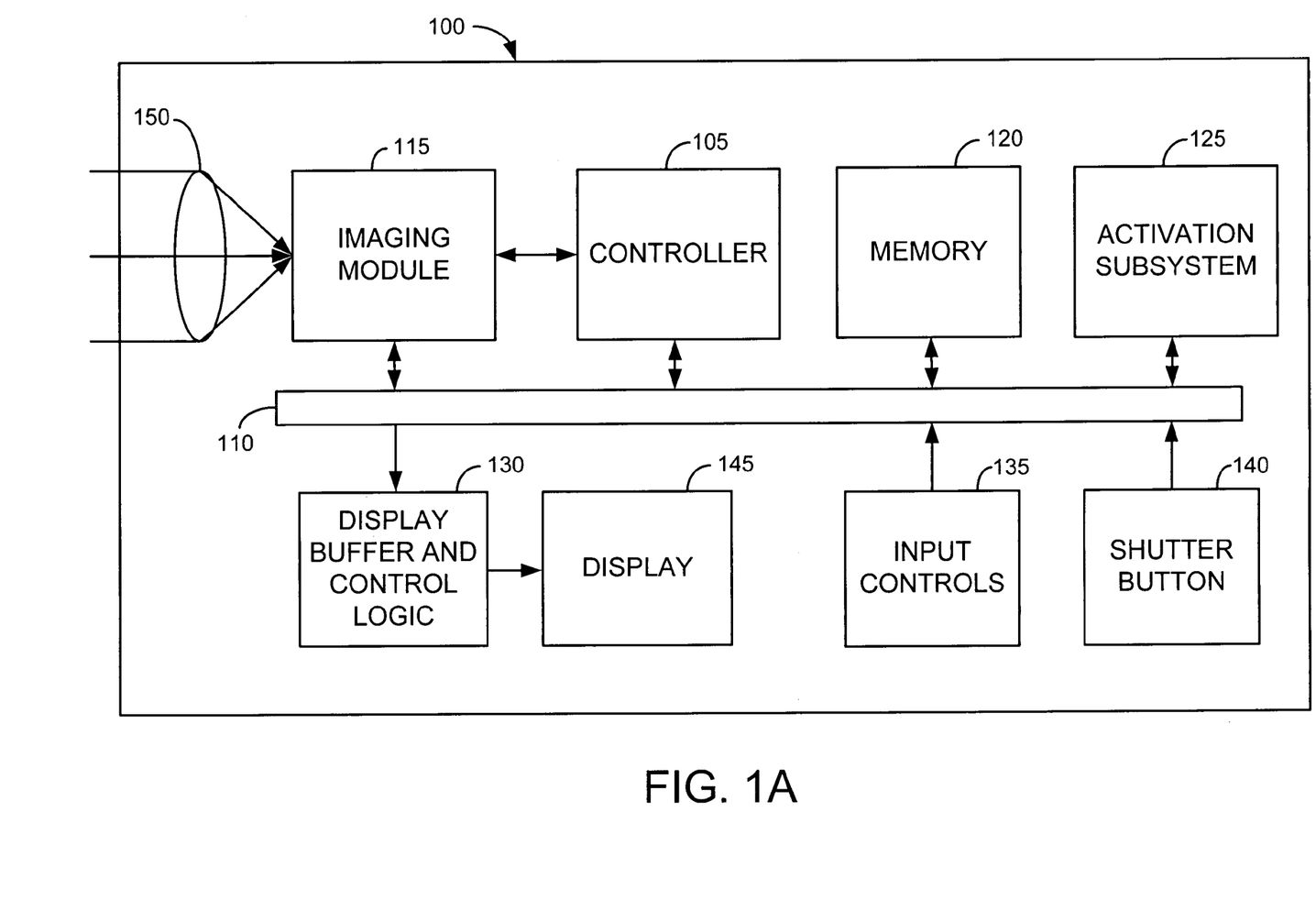
FIG. 1A is a functional block diagram of a digital camera in accordance with an illustrative embodiment of the invention.

FIG. 1A is a functional block diagram of a digital camera 100 in accordance with an illustrative embodiment of the invention. In FIG. 1A, controller 105 communicates over data bus 110 with imaging module 115, memory 120, activation subsystem 125, display buffer and control logic 130, input controls 135, and shutter button 140. Display buffer and control logic 130 is in turn connected with display 145. Display 145 may be, for example, a liquid crystal display (LCD). Optical system 150 produces optical images that are converted to digital images by imaging module 115. Input controls 135 may comprise navigational buttons, an input control (e.g., a button or switch) to activate a continuous focus and exposure mode in digital camera 100, and other input controls to control the operation of digital camera 100. Shutter button 140 may have an intermediate position (S1) and an image capture position (S2).

Figure 1B:
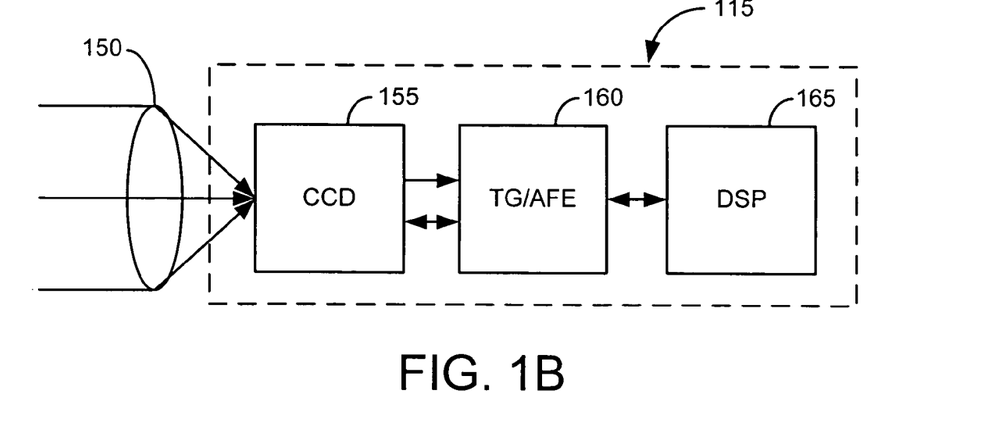
FIG. 1B is a functional block diagram of an imaging module of the digital camera shown in FIG. 1A in accordance with an illustrative embodiment of the invention.

FIG. 1B is a functional block diagram of imaging module 115 in accordance with an illustrative embodiment of the invention. Imaging module 115 may comprise an imaging sensor 155 (in this example, a CCD sensor array), a timing generator/analog front end (TG/AFE) 160, and a digital signal processor (DSP) 165. As indicated in FIG. 1A, imaging module 115, via DSP 165, may communicate directly with controller 105 in some embodiments. As indicated in FIG. 1B, both data and control signals connect imaging sensor 155 and TG/AFE 160. Imaging module 115 is configurable to produce both low-resolution frames (e.g., those associated with live view mode) and high-resolution frames as needed.

Figure 1C:
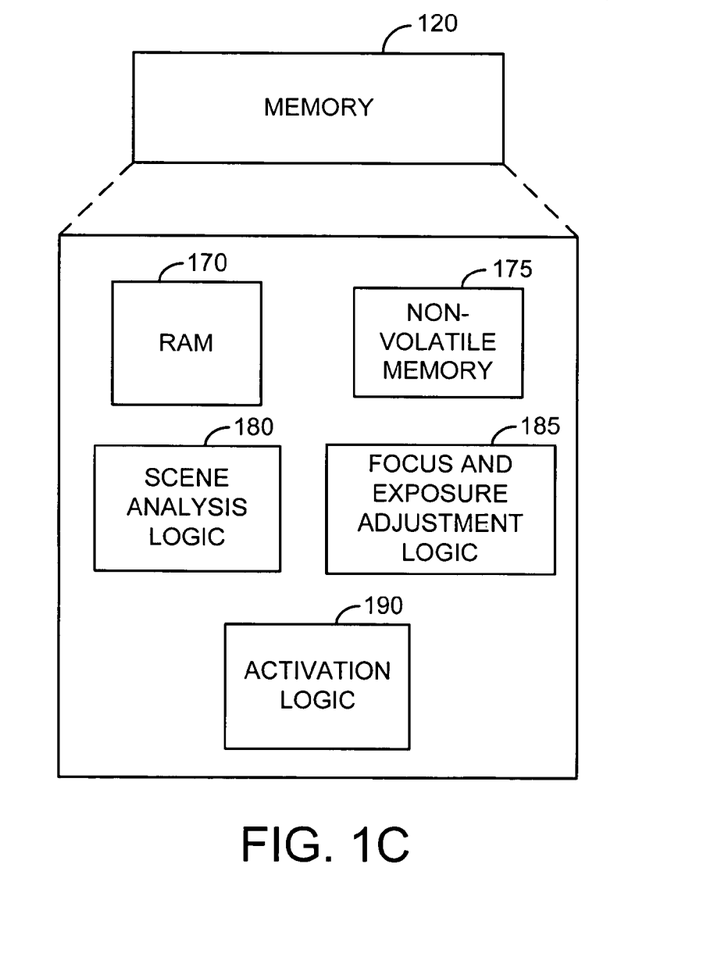
FIG. 1C is a functional diagram of a memory of the digital camera shown in FIG. 1A in accordance with an illustrative embodiment of the invention.

FIG. 1C is a functional diagram of memory 120 in accordance with an illustrative embodiment of the invention. Memory 120 may comprise random access memory (RAM) 170, non-volatile memory 175, scene analysis logic 180, focus and exposure adjustment logic 185, and activation logic 190. In some applications, non-volatile memory 175 may be of the removable variety (e.g., a secure digital or multi-media memory card).

Scene analysis logic 180 analyzes low-resolution frames from imaging module 115 to detect a scene change. In one embodiment, scene analysis logic 180 sums the absolute value of pixel differences between two or more low-resolution frames to detect the scene change. This technique, well known in the image compression art (e.g., MPEG-4), typically involves blocking the digital frames into 8-pixel×8-pixel or 16-pixel×16-pixel blocks. In the image compression context, absolute pixel differences between frames may be summed for each of a number of spatial offsets in a neighborhood surrounding each block to produce a motion vector indicating how the camera or the scene shifts spatially from one frame to another. In the context of the instant invention, a motion vector may not be required in some embodiments. In those embodiments, a simple metric comprising the sum of the absolute value of the pixel differences between low-resolution frames at zero spatial offset may suffice. For example, when the sum of the absolute value of the pixel differences exceeds a predetermined threshold, a scene change may be assumed to have occurred. In other embodiments, mean squared error may be used in computing the metric instead of the absolute value of pixel differences.

In another embodiment, scene analysis logic 180 converts the low-resolution frames to the well-known ($Y,C_b,C_r$) color space (luminance and two chrominance difference components). Using the Y (luminance) component, scene analysis logic 180 may compute an aggregate scene brightness for each low-resolution analysis frame. The aggregate scene brightness may be computed from the luminance component by a number of well-known methods, some of which may include the use of a histogram. By comparing the aggregate scene brightness of two or more low-resolution frames, scene analysis logic 180 can detect a scene change.

In yet another embodiment, scene analysis logic 180 may be configured to detect a single moving element in an otherwise static scene (e.g., a person or object moving laterally with respect to digital camera 100). Although a literal scene change occurs in such a case (i.e., some pixels change from frame to frame), there is no need to adjust focus and exposure because the focus distance (the distance from digital camera 100 to the single laterally moving element) has not changed. Configuring scene analysis logic 180 to detect this situation prevents unnecessary automatic fine focus and exposure adjustments in digital camera 100. Techniques for identifying a single moving element in an otherwise static scene are well known in the image processing art, especially in military and surveillance applications. For example, the fraction of pixels that change from frame to frame may be determined. A high percentage of unchanged pixels may indicate a single moving element in the scene. The presence of a single moving element may be confirmed through use of the techniques described above for computing a motion vector.

The low-resolution frames analyzed by scene analysis logic 180 do not have to be successive. For example, scene analysis logic 180 may analyze low-resolution frames that are separated by one or more intervening frames.

Focus and exposure adjustment logic 185 adjusts focus and exposure based on high-resolution frames when scene analysis logic 180 has detected a scene change. Techniques for performing fine focus and exposure adjustments based on high-resolution frames are well known in the digital camera art.

Activation logic 190 may activate a continuous focus and exposure mode in digital camera 100 in response to a predetermined signal from activation subsystem 125. Activation subsystem 125 and its associated output signal may take on a variety of forms.

In one embodiment, activation subsystem 125 comprises an attitude sensing subsystem that detects how digital camera 100 is being held by a user. For example, the attitude sensing subsystem may comprise one or more accelerometers or a gyroscope. When digital camera 100 is being held in a predetermined attitude associated with picture taking (e.g., the axis of optical system 150 is approximately parallel to the ground), activation subsystem 125 reports the condition, and activation logic 190, in response, may activate the continuous focus and exposure mode of digital camera 100.

In another embodiment, activation subsystem 125 may comprise a tactile sensing subsystem that detects when a user is lightly touching shutter button 140. Such tactile sensing subsystems are well known in the art and may be based on a detected change in resistance or capacitance in a circuit. When a user lightly touches shutter button 140, activation logic 190 may activate the continuous focus and exposure mode in response to a signal from the tactile sensing subsystem.

In another embodiment, activation subsystem 125 may comprise an optical sensor that detects when a user places a finger on or near shutter button 140. When a user places a finger near shutter button 140, activation logic 190 may activate the continuous focus and exposure mode in response to a signal from the optical sensor.

In yet another embodiment, activation logic 190 may activate the continuous focus and exposure mode in response to shutter button 140 being depressed to the S1 position.

In still another embodiment, activation logic 190 may activate the continuous focus and exposure mode in response to actuation of an input control 135 (e.g., a continuous focus and exposure mode button), as noted above. In a variation of this embodiment, the continuous focus and exposure mode may be selected from a menu on display 145 of digital camera 100 with the aid of input controls 135.

The divisions among activation subsystem 125, scene analysis logic 180, focus and adjustment logic 185, and activation logic 190 are purely functional. In general, these functions may be separated or combined in ways other than that shown in FIGS. 1A and 1C and may be implemented in hardware, firmware, software, or any combination thereof. In one embodiment, scene analysis logic 180, focus and exposure adjustment logic 185, and activation logic 190 are stored program instructions that may be executed by controller 105.

Figure 2A:
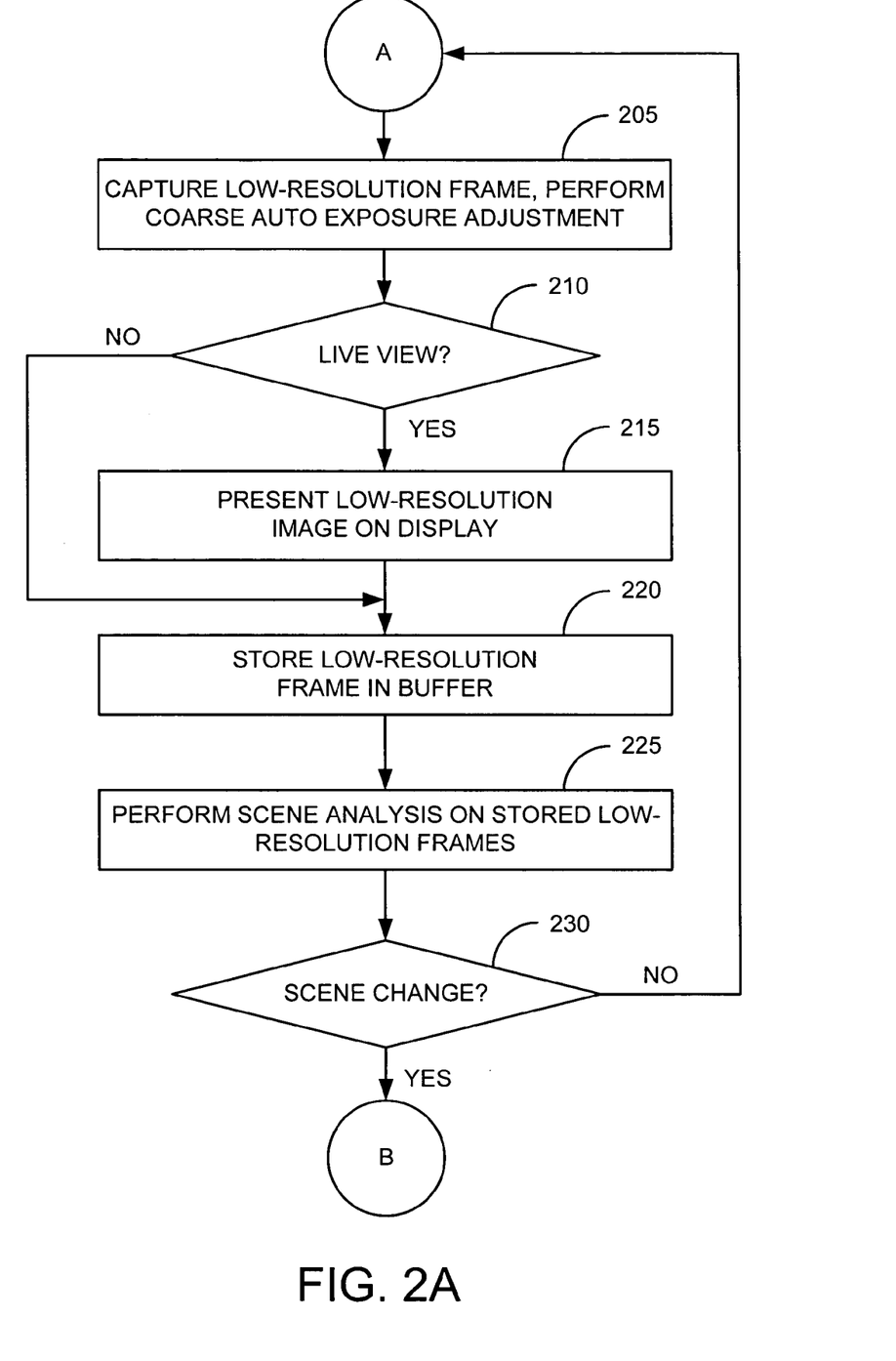
FIGS. 2A-2C are a flowchart of the operation of the digital camera shown in FIG. 1A in accordance with an illustrative embodiment of the invention.
Figure 2B:
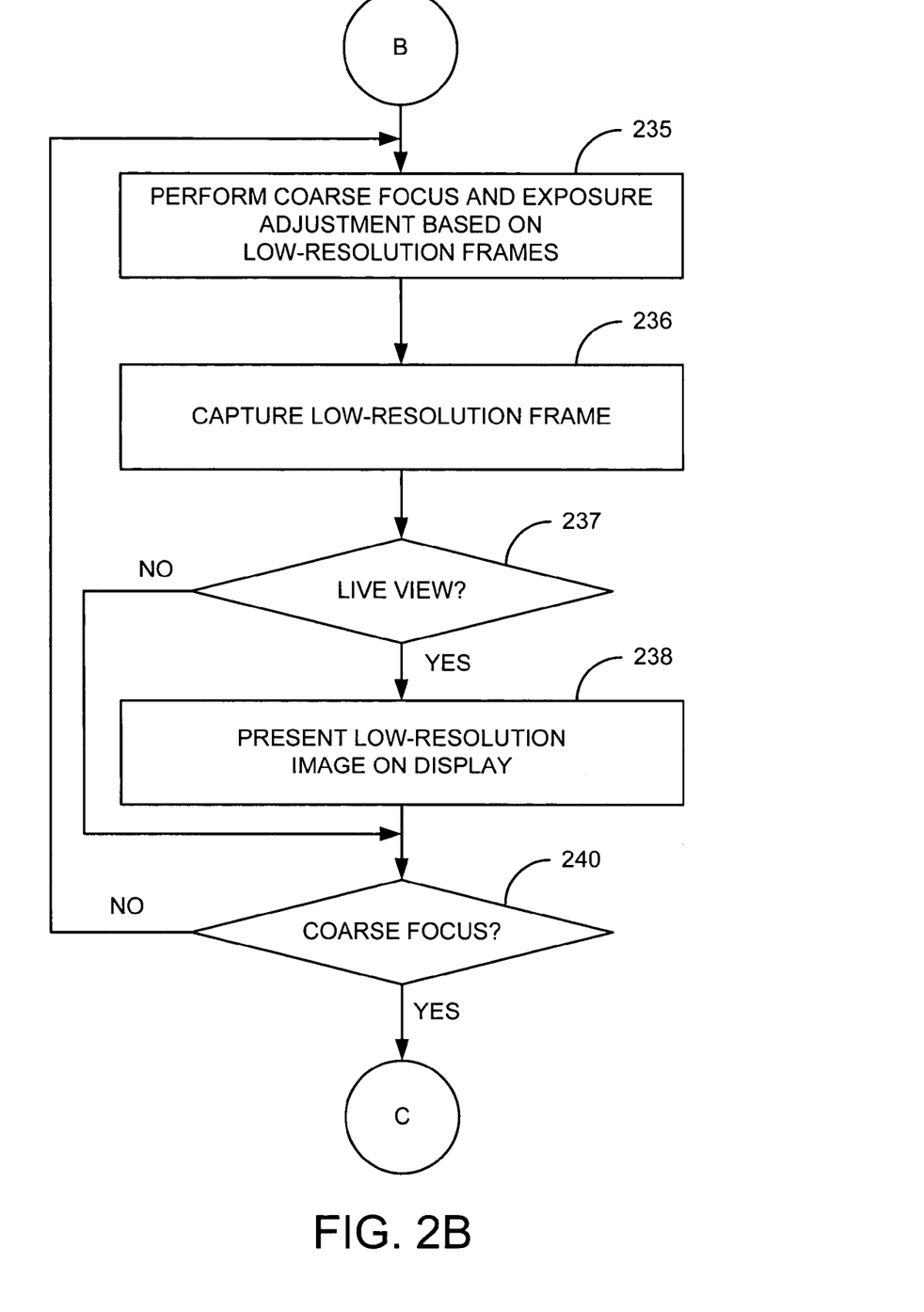
Figure 2C:
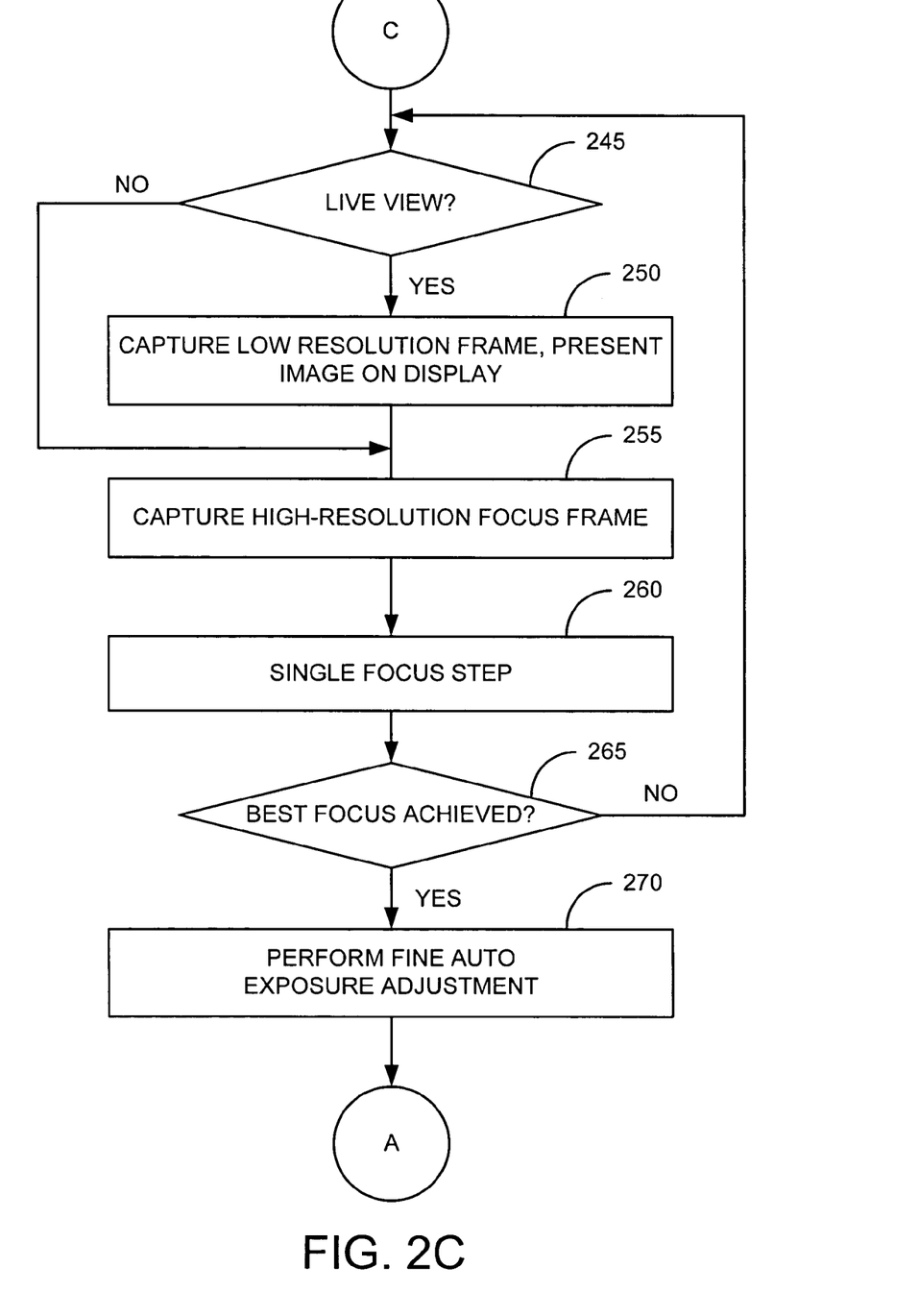

FIGS. 2A-2C are a flowchart of the operation of digital camera 100 in accordance with an illustrative embodiment of the invention. Point "A" is reached when activation logic 190 has activated the continuous focus and exposure mode of digital camera 100. At 205, imaging module 115 captures low-resolution frames, and focus exposure and adjustment logic 185 performs a coarse automatic exposure adjustment. If the live view mode of digital camera 100 is enabled at 210, the low-resolution frame is shown on display 145 at 215. Live view mode typically displays low-resolution frames at 30 frames per second. At 220, the low-resolution frame may be stored in a buffer (e.g., some portion of memory 120). Scene analysis logic 180 analyzes two or more stored low-resolution frames at 225 to detect a scene change. If a scene change is detected at 230, control proceeds to point "B" in FIG. 2B. Otherwise, control returns to point "A." Steps 205 through 230 in FIG. 2A may be termed a "Monitor & Live View Sequence" in which low-resolution frames are captured and analyzed to determine whether or not a scene change has occurred.

FIG. 2B shows optional steps that may be performed to further enhance the performance of the continuous focus and exposure mode. At 235, focus and exposure adjustment logic may perform coarse focus and exposure adjustments based on low-resolution frames. At 236, imaging module 115 captures a low-resolution frame. If live view is enabled at 237, the low-resolution frame is shown on display 145 at 238. This process is repeated until the test at 240 is satisfied, indicating that coarse focus has been achieved. Once coarse focus has been achieved, control proceeds to point "C" in FIG. 2C.

If live view mode is enabled at 245 in FIG. 2C, a low-resolution frame captured at 250 is presented on display 145. Otherwise, control skips to 255, where a high-resolution focus frame is captured. Further details regarding high-resolution frames are provided later in this detailed description. At 260, optical system 150 may be adjusted by a single focus step. If the best focus has been achieved at 265, focus and exposure adjustment logic 185 may perform a fine auto exposure adjustment at 270, after which control returns to point "A." Otherwise, control returns to 245, and the fine focus and exposure loop continues until convergence is achieved. Steps 245 through 270 may be termed a "Focus & Exposure Sequence" that is activated when a scene change is detected by the "Monitor & Live View Sequence."

If shutter button 140 is depressed to the image capture position (S2), a final fine focus and exposure adjustment may be performed, if necessary, and imaging module 115 may capture a final digital image.

The high-resolution frames upon which focus and exposure adjustment logic 185 bases its focus and exposure adjustments may be in any of a variety of formats. For example, the high-resolution frames may be full-resolution readouts from imaging sensor 155. In other embodiments, the high-resolution frames may be in the Video Graphics Array (VGA) format, the Super VGA (SVGA) format, the 720P format (intermediate between SVGA and high-definition), or any other suitable high-resolution format.

Figure 3:
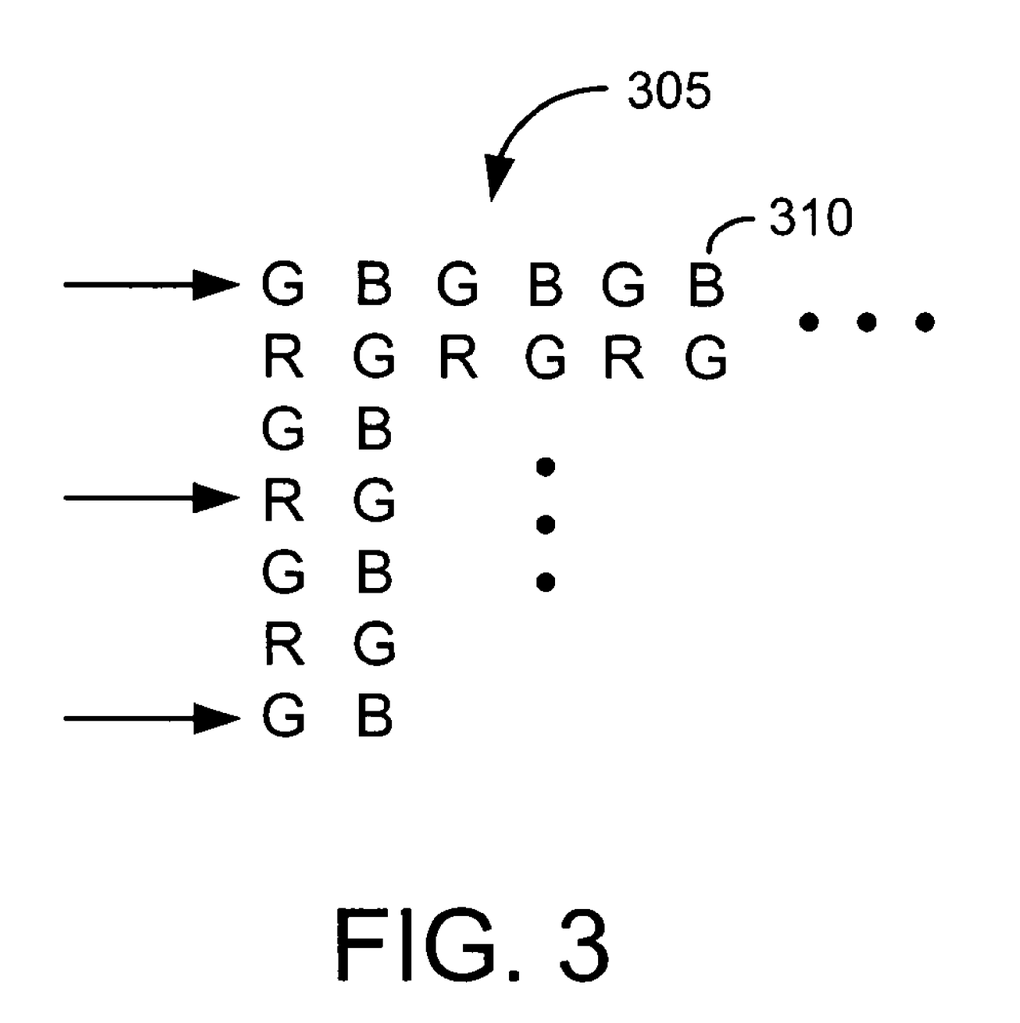
FIG. 3 is an illustration of a portion of a Bayer pattern associated with an imaging sensor having an odd number of fields in accordance with an illustrative embodiment of the invention.

In one embodiment, a different kind of high-resolution frame may be employed that takes advantage of the properties of CCD imaging sensors 155 having an odd number of fields per frame. FIG. 3 is an illustration of a portion of a Bayer pattern associated with a CCD imaging sensor 155 that has three fields per frame in accordance with an illustrative embodiment of the invention. The rows of imaging sensors associated with one of the three fields are indicated by the arrows on the left side of the figure. Reading out the single field indicated by the arrows can produce a coherent image because the readout includes red, green, and blue color information. Therefore, the high-resolution frames may be single-field readouts from an imaging sensor 155 having an odd number of fields.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for automatically maintaining focus and exposure settings in a digital imaging device, comprising:
    activating a continuous focus and exposure mode in the digital imaging device;
    capturing and analyzing first frames having a first resolution until a scene change is detected;
    performing a coarse focus based on the first frames, when the scene change has been detected;
    capturing second frames having a second resolution greater than the first resolution and adjusting the focus setting based on the second frames to achieve a best focus, when the scene change has been detected; and
    performing a fine adjustment to the exposure setting, when the best focus has been achieved.

2. The method of claim 1, wherein the continuous focus and exposure mode is activated in response to an input signal.

3. The method of claim 2, wherein the input signal comprises a shutter button of the digital imaging device being depressed to an intermediate position.

4. The method of claim 2, wherein the input signal comprises selection by a user of a continuous focus and exposure mode option in the digital imaging device.

5. The method of claim 2, wherein the input signal comprises sensing that a user is holding the digital imaging device in a predetermined manner.

6. The method of claim 2, wherein the input signal comprises sensing that a shutter button of the digital imaging device is being lightly touched by a user.

7. The method of claim 1, wherein analyzing first frames comprises summing the absolute value of pixel differences between at least two first frames.

8. The method of claim 1, wherein analyzing first frames comprises comparing an aggregate luminance of at Least two first frames.

9. The method of claim 1, wherein analyzing first frames comprises detecting a single moving element in an otherwise static scene.

10. The method of claim 1, wherein the second frames comprise one of full-resolution imaging-sensor readouts, VGA, SVGA, 720P, and single-field readouts from an imaging sensor having an odd number of fields.

11. The method of claim 1, further comprising:
    performing the coarse focus and exposure adjustments in the digital imaging device based on the first frames after the scene change has been detected and prior to adjusting the focus and exposure settings based on the second frames.

12. The method of claim 1, wherein a live view mode of the digital imaging device is active in which the first frames are captured and presented on a display of the digital imaging device both before and after the scene change has been detected, the first frames being captured in addition to the second frames during adjustment of the focus and exposure settings based on the second frames.

13. The method of claim 1, wherein the digital imaging device is a digital camera.

14. A digital imaging device, comprising:
    an imaging module to convert optical images to digital image frames, the imaging module being configurable to produce first digital image frames at a first resolution and second digital image frames at a second resolution, wherein the second resolution is greater than the first resolution;
    scene analysis logic that analyzes the first digital image frames to detect a scene change; and
    focus and exposure adjustment logic configured to adjust focus and exposure settings of the digital imaging device based on the second digital image frames, when the scene analysis logic has detected the scene change;

wherein the focus and exposure adjustment logic is configured to perform a coarse focus based on the first digital image frames, when the scene analysis logic has detected the scene change;

wherein the focus and exposure adjustment logic is configured to adjust the focus setting based on the second digital image frames to achieve a best focus, when the scene analysis logic has detected the scene change;

wherein the focus and exposure adjustment logic is configured to perform a fine adjustment to the exposure setting when the best focus has been achieved.

15. The digital imaging device of claim 14, wherein the digital imaging device has a continuous focus and exposure mode.

16. The digital imaging device of claim 15, further comprising:
an input control to activate the continuous focus and exposure mode.

17. The digital imaging device of claim 15, further comprising:
an attitude sensing subsystem to detect how the digital imaging device is being held by a user; and
activation logic configured to activate the continuous focus and exposure mode, when the attitude sensing subsystem detects that the digital imaging device is being held in a predetermined manner.

18. The digital imaging device of claim 17, wherein the attitude sensing subsystem comprises one of an accelerometer and a gyroscope.

19. The digital imaging device of claim 15, further comprising:
a shutter button;
a tactile sensing subsystem to detect whether the shutter button is being lightly touched by a user; and
activation logic configured to activate the continuous focus and exposure mode, when the tactile sensing subsystem detects that the shutter button is being lightly touched by the user.

20. The digital imaging device of claim 15, further comprising:
a shutter button having an intermediate position and an image capture position; and
activation logic configured to activate the continuous focus and exposure mode, when the shutter button is depressed to the intermediate position.

21. The digital imaging device of claim 14, wherein the scene analysis logic is configured to sum the absolute value of pixel differences between at least two first digital image frames.

22. The digital imaging device of claim 14, wherein the scene analysis logic is configured to compare an aggregate luminance of at least two first digital image frames.

23. The digital imaging device of claim 14, wherein the scene analysis logic is configured to detect a single moving element in an otherwise static scene.

24. The digital imaging device of claim 14, wherein the imaging module comprises an imaging sensor and the imaging module is configured to produce second digital image frames comprising one of full-resolution imaging-sensor readouts, VGA, SVGA, and 720P.

25. The digital imaging device of claim 24, wherein the imaging sensor has an odd number of fields and the imaging module is configured to produce second digital image frames comprising readouts from a single field of the imaging sensor.

26. The digital imaging device of claim 14, further comprising:
a display;
display control logic configured to present the first digital frames on the display, when a live view mode of the digital imaging device is active; and
wherein the imaging module is configured to capture the first digital frames in addition to the second digital frames during adjustment of the focus and exposure settings by the focus and exposure adjustment logic, when the live view mode is active.

27. A digital imaging device, comprising:
means for converting optical images to digital image frames, the means for converting optical images to digital image frames being configurable to produce first digital image frames at a first resolution and second digital image frames at a second resolution, wherein the second resolution is greater than the first resolution;
means for analyzing first digital image frames to detect a scene change; and
means for adjusting focus and exposure settings of the digital imaging device based on the second digital image frames, when the means for analyzing the first digital image frames has detected the scene change;
wherein the means for adjusting the focus and exposure settings is configured to perform a coarse focus based on the first digital image frames, when the means for analyzing the first digital image frames has detected the scene change;
wherein the means for adjusting the focus and exposure settings is configured to adjust the focus setting based on the second digital image frames to achieve a best focus, when the means for analyzing the first digital image frames has detected the scene change;
wherein the means for adjusting the focus and exposure settings is configured perform a fine adjustment to the exposure setting, when the best focus has been achieved.

* * * * *

UNITED STATES PATENT AND TRADEMARK OFFICE
CERTIFICATE OF CORRECTION

PATENT NO. : 7,304,681 B2  Page 1 of 1
APPLICATION NO. : 10/762872
DATED : December 4, 2007
INVENTOR(S) : Joel B. Larner et al.

It is certified that error appears in the above-identified patent and that said Letters Patent is hereby corrected as shown below:

In column 8, line 51, in Claim 27, after "configured" insert -- to --.

Signed and Sealed this

Seventeenth Day of June, 2008

JON W. DUDAS
*Director of the United States Patent and Trademark Office*